Nov. 28, 1944.   C. R. DOWN   2,363,485
TELESCOPIC SHOCK ABSORBER
Filed Aug. 2, 1943
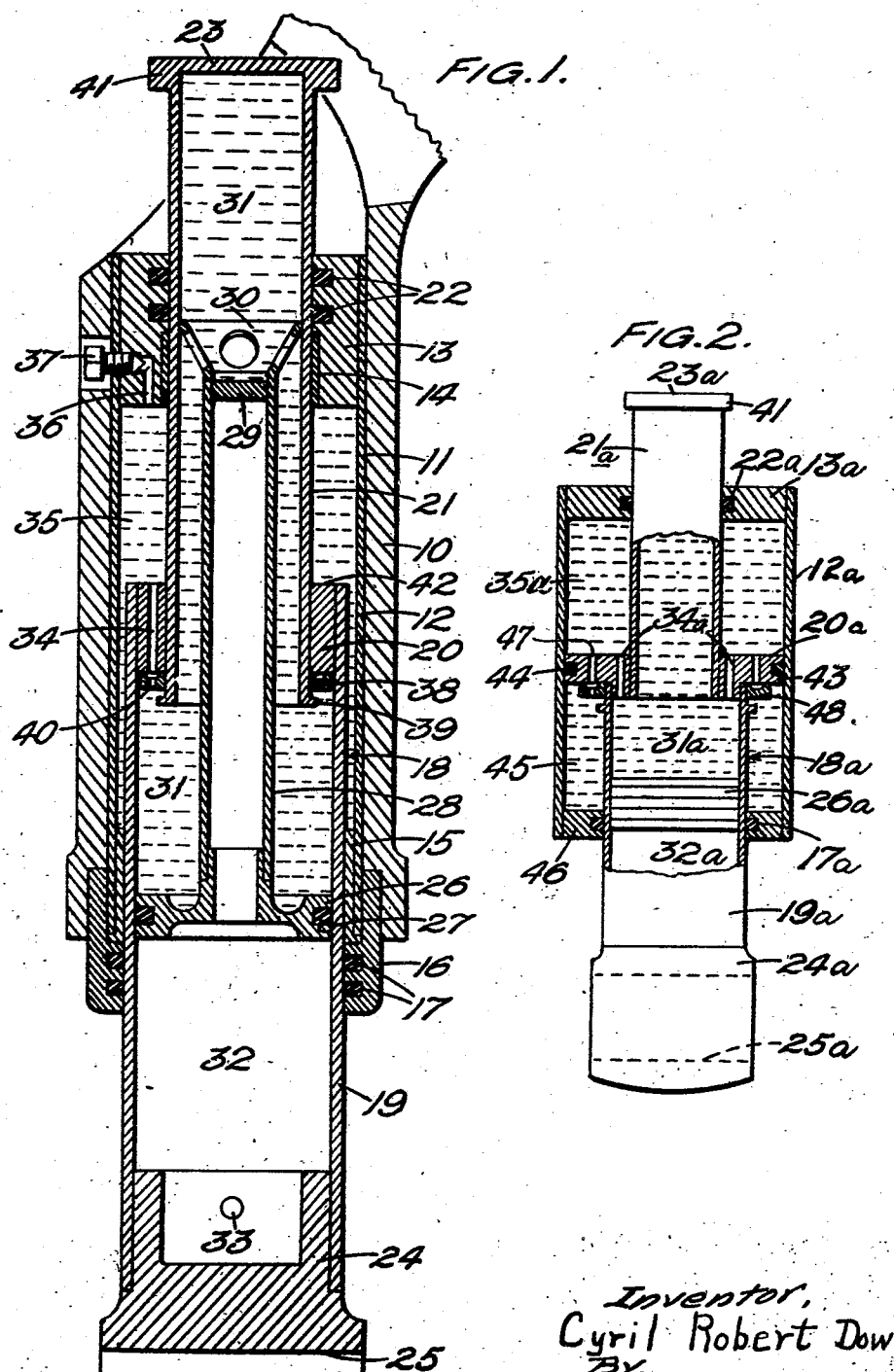
Inventor,
Cyril Robert Down
BY
Charles M. Funkhouser Atty.

Patented Nov. 28, 1944

2,363,485

UNITED STATES PATENT OFFICE 2,363,485

TELESCOPIC SHOCK ABSORBER

Cyril Robert Down, Leamington Spa, England, assignor to Automotive Products Company Limited, Leamington Spa, England Application August 2, 1943, Serial No. 497,088
In Great Britain March 30, 1942

10 Claims. (Cl. 267—64)

This invention relates to telescopic shock absorbers, and it has for its object to provide an improved form and construction which is especially suitable for shock absorbers of the oleopneumatic type in which a working space of variable volume contains a quantity of gas under pressure to provide a resilient supporting means for the normal load on the shock absorber, and a quantity of liquid, which latter is forced through one or more relatively constricted apertures as the volume of the working space changes, thus damping the movements of the shock absorber.

In particular the invention sets out to provide an exceptionally compact construction of shock absorbing strut for incorporation in the landing gear of aircraft.

In a telescopic shock absorber having a hollow plunger which contains damping liquid and is slidably mounted within one end of a cylinder, the present invention is characterised by the fact that said plunger is formed with a portion of reduced cross-sectional area extending slidably through the opposite end of the cylinder, the cylinder space surrounding the reduced portion of the plunger containing damping liquid and being connected through flow restricting means with the interior of the plunger.

As a further feature of the invention there is provided a telescopic shock absorber comprising a cylinder, a stepped plunger having portions of large and small cross-sectional area slidable respectively through the ends of the cylinder, each in a fluid-tight manner, the cylinder space surrounding the plunger being filled with damping liquid and being connected with the interior of said plunger through flow restricting means arranged to bring about liquid damping of the sliding movement of the plunger relative to the cylinder.

Further, the improved telescopic shock absorber may comprise a tubular cylinder, a stepped hollow plunger member slidable axially within the cylinder and projecting from both ends thereof, with a fluid-tight seal at one end of the cylinder slidably engaged by a larger diameter portion of the plunger member, and another fluid-tight seal at the opposite end of the cylinder slidably engaged by a smaller diameter portion of the plunger member, damping liquid within an annular cylinder space surrounding the plunger member, and a damping valve device provided in the plunger member to produce a restricted communication between the interior of the plunger member and the said annular cylinder space.

The invention further contemplates the provision of a telescopic shock absorber comprising in combination a cylinder, a hollow plunger extending axially within the cylinder and projecting from both ends thereof through fluid-tight packing devices, one end portion of the plunger member being smaller in diameter than the other to form an annular variable volume space within the cylinder, damping liquid filling said annular space and also partially filling the plunger member, resilient means within the plunger member placing the liquid therein under pressure, and a damping valve in the plunger member forming a constricted communication for damping liquid between the interior of the plunger member and the variable volume cylinder space.

Preferably the plunger member comprises a pair of tubes of different outside diameters arranged in axial alignment with their adjacent ends connected together and their outer ends closed, the tubes of the plunger member conveniently being connected together by a collar which is secured to the outside of the smaller tube and to the inside of the larger tube. Flow restricting means operatively interposed between the damping liquid in the cylinder and the liquid within the plunger member conveniently comprises a damping valve member which is mounted upon the plunger member at the position where the portion of smaller cross-sectional area joins the portion of larger cross-sectional area.

The invention is illustrated by way of example in the accompanying diagrammatic drawing, in which:

Figure 1 is a sectional elevation through one form of shock absorbing strut incorporated in an aircraft undercarriage; and Figure 2 is an elevation, partly in section, showing a modified arrangement.

In the embodiment shown in Figure 1 the undercarriage includes a fork member, one limb of which is indicated at 10, and is formed with a substantially vertical cylindrical bore 11, lined with a cylinder tube 12. The cylinder tube 12 is open at both ends, although the effective diameter at the upper end is reduced somewhat by the insertion of an annular plug 13 fitted with a tubular bush 14 composed of wear-resisting anti-frictional material. A second tubular bush 15 is fitted at the lower end of the cylinder 12 and is held in position by a gland member 16, conveniently grooved internally for the accommodation of packing rings 17.

A hollow plunger member, indicated generally at 18, is arranged to slide axially within the cylinder 12 and comprises a lower tubular portion 19, which is of relatively large diameter, connected rigidly at its upper end by a collar 20 with an upper portion 21 of relatively small diameter. The upper tubular portion 21 slides snugly through the bearing bush 14, and a liquid-tight joint within the plug 13 is secured by the provision of packing rings 22. The upper end of the tubular portion 21 is closed completely, as indicated at 23. Similarly the lower tubular portion 19 slides snugly through the bearing bush 15 and the sliding joint is sealed by the packing rings 17, the lower end of the tubular portion 19 being closed by a plug 24, which is bored at 25 to receive the usual axle (not shown) of the landing wheel.

A floating piston 26, having a packing ring 27, is freely slidable within the lower tubular portion 19 and is fitted with an upwardly extending tubular stem 28 sealed near its upper end by a disk 29 welded or otherwise secured within the bore of the stem. The upper extremity of the stem 28 is formed with large perforations, and is flared to form a guide 30, which is freely slidable without undue looseness within the upper tubular portion 21 of the plunger member 18. Thus the floating piston 26 serves to divide the interior of the plunger member 18 into two separate compartments, which are indicated at 31 and 32 respectively, the compartment 31 including the whole of the plunger space disposed outside the stem 28, while the compartment 32 includes the space within the stem 28 as far up as the disk 29. An air inlet valve, indicated at 33, is provided to enable compressed air to be pumped into the compartment 32. The compartment 31 is completely filled with damping liquid, which latter extends through one or more passages 34 formed in the collar 20, to the annular space 35, which is herein termed the "cylinder space." The requisite quantity of damping liquid is inserted through a passage 36, having a closure plug 37, the shock absorber usually being charged with liquid before the air is pumped into the compartment 32.

A damping valve is provided in conjunction with the passage or passages 34, said valve conveniently comprising an annular valve member 38, which is arranged to slide upon the lower end of the tubular portion 21, its movement being limited by a stop flange 39. The upper surface of the valve member 38 is provided with a circular groove and from the bottom of this one or more relatively small damping passages 40 lead into the compartment 31. Thus, when the liquid pressure in the cylinder space 35 is greater than that in the compartment 31 the damping liquid can flow relatively freely through the passage or passages 34 and then past the outside of the valve member 38 to the compartment 31. On the other hand, when liquid tends to flow in the opposite direction the valve member 38 is lifted and closes the passage or passages 34, except insofar as liquid can flow relatively slowly through the damping passages 40. This form of valve is, of course, quite well known in the art.

In order to limit the stroke of the plunger member 18 it is formed at its upper end with a flange 41 adapted to co-operate with the upper part of the annular plug 13 for limiting the downward movement, while upward movement is similarly restricted by the engagement of the shoulder 42 of the plunger member 18 with the underneath surface of said annular plug 13.

When the aircraft lands, or encounters a bump during taxying, the plunger member 18 is forced upwardly, which has the effect of reducing the volume of the cylinder space 35 owing to the "stepped" construction of said plunger member. Therefore, damping liquid is ejected from the cylinder space 35 and flows relatively freely through the passage or passages 34 into the compartment 31 of the plunger member. The entering liquid forces down the floating piston 26 and consequently increases the compression of the air within the compartment 32. When the initial movement of the plunger member finishes, the increased force exerted by the air within the compartment 32 causes the recoil or downward stroke of the plunger member 18 to commence. The speed at which this stroke can take place, however, is determined mainly by the rate at which damping liquid from the compartment 31 can escape through the damping passages 40 back into the cylinder space 35. The quantity of liquid displaced from the cylinder space 35 during upward movement of the plunger member 18 is, of course, dependent upon the difference in the cross-sectional areas of the larger portion 19 of the plunger member and the smaller portion 21 thereof; as this effective area can be made relatively small, the shock absorber can readily be arranged so that only a small movement of the floating piston 26 is brought about by the full stroke of the shock absorber. Therefore the variation in pressure within the compartment 32 is correspondingly small and a high air pressure can satisfactorily be used, thus enabling a relatively compact shock absorber to be designed. The fact that the interior of the stem 28 forms part of the air compartment 32 also assists in this connection.

A somewhat modified construction of shock absorbing strut is shown diagrammatically in Figure 2, similar but not identical parts being indicated by use of the same numerals together with the suffix "a". In general arrangement it resembles that shown in Figure 1 but the collar 20a is extended radially to form a piston 43 which slides in a liquid-tight manner within the cylinder 12a owing to the provision of a packing ring 44; the piston consequently divides the cylinder space into two separate portions, namely a main cylinder space 35a and an annular recoil damping chamber 45. It will be noted that in order that the recoil damping chamber 45 may have a sufficient cross-sectional area the lower tube 19a of the plunger member 18a is arranged to be substantially smaller than the cylinder tube 12a. The lower part of the recoil damping chamber 45 is closed by an annular plug 46, having a packing ring 17a.

The collar 20a is formed with several passages 34a which enable liquid to flow relatively freely between the main cylinder space 35a and the plunger compartment 31a no damping valve usually being provided in this connection.

The piston flange 43 is formed with a plurality of passages 47 affording communication between the main cylinder space 35a and the recoil damping chamber 45, said passages, however, being controlled by an annular damping valve member 48 similar in construction to the valve member 38 in Figure 1.

During upward movement of the plunger member 18a some of the liquid from the main cylinder space 35a flows through the passages 47 into the recoil damping chamber 45, the flow being fairly free so that the upward movement is not substantially affected. At the same time the remainder of the liquid ejected from the main cylinder space 35a flows through the passages 34a into the plunger member 18a and pressing down the floating piston 26a increases the pressure of the air in the compartment 32a.

When the downward or recoil stroke of the plunger member 18a commences, the damping liquid, in trying to flow from the recoil damping chamber 45 back to the main cylinder space 35a, lifts the damping valve 48 to its "closed" position, in which the liquid is constrained to flow through one or more very small openings in the valve member 48. Therefore, downward movement of the plunger member 18a is positively damped by the liquid which is trapped in the recoil damping chamber 45 and at the same time there is no danger of a partial vacuum being formed in the main cylinder space 35a as liquid can return relatively freely to that space from the compartment 31a.

It will be understood that the preferred constructions are capable of many modifications in order to suit particular requirements. For instance, the shock absorbing strut can be arranged to operate in any desired position, as the damping liquid and compressed air are efficiently separated by the floating piston. The damping valve device may, of course, take various forms and it can be incorporated, if desired, in the wall of the upper or lower part of the plunger member. It will be observed that, in the construction shown in Figure 1, the only tube surfaces which require to be finely finished in order to produce efficient sliding are the external surfaces of the upper and lower parts of the plunger member and the internal surface of the lower part thereof. In some cases it may be possible to produce the plunger member from a single length of tubing which is rolled or otherwise treated so that its two end portions are of the requisite different diameters.

What I claim is:

1. A telescopic shock absorber having a hollow plunger which contains damping liquid and is slidably mounted within one end of a cylinder, wherein said plunger is formed with a portion of reduced cross-sectional area extending slidably through the opposite end of the cylinder to form a cylinder space opening only to the inside of the plunger, the cylinder space surrounding the reduced portion of the plunger containing damping liquid and being connected through flow restricting means with the interior of the plunger, and means for maintaining pressure on the liquid.

2. A telescopic shock absorber comprising in combination a cylinder, a hollow plunger extending axially within the cylinder and projecting from both ends thereof through fluid-tight packing devices, one end portion of the plunger member being smaller in diameter than the other to form an annular variable volume space within the cylinder, damping liquid filling said annular space and also partially filling the plunger member, resilient means within the plunger member placing the liquid therein under pressure, and a damping valve in the plunger member forming a constricted communication for damping liquid flow between the interior of the plunger member and the variable volume cylinder space.

3. A telescopic shock absorber as claimed in claim 2, wherein the plunger member comprises a pair of tubes of different outside diameters arranged in axial alignment with their adjacent ends connected together and their outer ends closed.

4. A telescopic shock absorber as claimed in claim 2, wherein the plunger member comprises a pair of tubes of different outside diameters arranged in axial alignment with their adjacent ends connected together and their outer ends closed, the tubes of the plunger member being connected together by a collar which is secured to the outside of the smaller tube and to the inside of the larger tube.

5. A shock absorber as claimed in claim 2, wherein the damping valve is mounted upon the plunger member at the position where the portion of smaller cross-sectional area joins the portion of larger cross-sectional area.

6. A shock absorber as claimed in claim 2, wherein the resilient means within the plunger member is a quantity of compressed gas, and a floating piston is arranged to separate the damping liquid in the plunger member from the compressed gas, the floating piston being slidably mounted in that portion of the plunger member having the larger cross-sectional area.

7. A shock absorber as claimed in claim 2, wherein the resilient means within the plunger member is a quantity of compressed gas, and a floating piston is arranged to separate the damping liquid in the plunger member from the compressed gas, the floating piston being slidably mounted in that portion of the plunger member having the larger cross-sectional area and being provided with an axial stem which engages slidably with the interior of the smaller cross-sectional portion of the plunger member, thus retaining the floating piston substantially in true alignment with the plunger member.

8. A shock absorber as claimed in claim 2, wherein the resilient means within the plunger member is a quantity of compressed gas, and a floating piston is arranged to separate the damping liquid in the plunger member from the compressed gas, the floating piston being slidably mounted in that portion of the plunger member having the larger cross-sectional area and being provided with an axial stem which engages slidably with the interior of the smaller cross-sectional portion of the plunger member, thus retaining the floating piston substantially in true alignment with the plunger member, the stem portion of the floating piston being hollow and having its interior in free communication with the compressed gas space.

9. A shock absorber as claimed in claim 2, wherein the larger cross-sectional portion of the plunger member is smaller than the interior of the cylinder and a piston flange formed upon the plunger member engages slidably with the interior of the cylinder, thereby dividing the annular cylinder space into a main cylinder space and a recoil damping chamber.

10. A shock absorber as claimed in claim 2, wherein the larger cross-sectional portion of the plunger member is smaller than the interior of the cylinder and a piston flange formed upon the plunger member engages slidably with the interior of the cylinder, thereby dividing the annular cylinder space into a main cylinder space and a recoil damping chamber, the damping valve acting as a restricted communication between the recoil damping chamber and the main cylinder space.

CYRIL ROBERT DOWN.